United States Patent
Symanowski et al.

(10) Patent No.: US 6,890,108 B2
(45) Date of Patent: May 10, 2005

(54) LIGHT-MIXING ROD

(75) Inventors: Christfried Symanowski, Jena (DE); Jens Hofmann, Apolda (DE); Enrico Geissler, Jena (DE); Arne Troellsch, Grossschwabhausen (DE); Mario Zielke, Jena (DE); Harald Kiessling, Hirschberg (DE)

(73) Assignee: Carl Zeiss Jean GmbH, Jena (DE)

( * ) Notice: Subject to any disclaimer, the term of this patent is extended or adjusted under 35 U.S.C. 154(b) by 43 days.

(21) Appl. No.: 10/641,326

(22) Filed: Aug. 14, 2003

(65) Prior Publication Data

US 2004/0091216 A1 May 13, 2004

(30) Foreign Application Priority Data

Aug. 14, 2002 (DE) .......................................... 102 37 202

(51) Int. Cl.⁷ .............................. G02B 6/36; G02B 6/00
(52) U.S. Cl. ........................ 385/88; 385/147; 385/901; 362/559
(58) Field of Search ............................. 385/88–90, 147, 385/901, 28, 50; 362/385, 559, 555; 353/35

(56) References Cited

U.S. PATENT DOCUMENTS

| | | | |
|---|---|---|---|
| 5,367,590 A | | 11/1994 | Davenport et al. |
| 5,408,551 A | * | 4/1995 | Maria van Woesik ........ 385/28 |
| 5,622,423 A | | 4/1997 | Lee |
| 5,682,448 A | * | 10/1997 | Riser et al. .................... 385/31 |
| 5,997,150 A | | 12/1999 | Anderson |
| 6,222,623 B1 | | 4/2001 | Wetherell |
| 6,558,000 B2 | * | 5/2003 | Muehlhoff et al. ............. 353/30 |
| 6,580,469 B1 | | 6/2003 | Rieche et al. |
| 6,594,424 B2 | | 7/2003 | Schmidt et al. |
| 6,741,875 B1 | * | 5/2004 | Pawluczyk et al. ......... 600/310 |
| 6,773,113 B2 | * | 8/2004 | Muehlhoff et al. ............. 353/35 |
| 2002/0097354 A1 | | 7/2002 | Greiner |
| 2002/0097578 A1 | | 7/2002 | Greiner |
| 2002/0136027 A1 | * | 9/2002 | Hansler et al. .............. 362/559 |
| 2002/0180936 A1 | * | 12/2002 | Muehlhoff et al. ............. 353/31 |

FOREIGN PATENT DOCUMENTS

| | | |
|---|---|---|
| DE | 290 725 A5 | 6/1991 |
| DE | 43 09 389 C2 | 9/1993 |
| DE | 101 02 585 A1 | 7/2002 |
| DE | 101 02 586 A1 | 7/2002 |
| DE | 101 03 100 A1 | 8/2002 |
| WO | WO 01/07828 A1 | 2/2001 |

* cited by examiner

*Primary Examiner*—Akm Enayet Ullah
(74) *Attorney, Agent, or Firm*—Patterson, Thuente, Skaar & Christensen, P.A.

(57) ABSTRACT

The invention relates to a light-mixing rod for homogenizing a light bundle, preferably for use in projection devices, wherein the intensity centroid of the light bundle moves in a longitudinal direction between a light inlet surface and a light outlet surface, and reflecting surfaces are present in the light-mixing rod, the surface normals of said reflecting surfaces being perpendicular or inclined relative to said longitudinal direction, with partial beams being reflected by said reflecting surfaces so as to guide the light bundle. Light emitting diodes having a direction of action oriented toward the interior space and having a defined radiation characteristic are provided in the lateral surfaces of the light-mixing rod and/or in the light inlet surface for the purpose of forming the light bundle.

23 Claims, 3 Drawing Sheets

LIGHT-MIXING ROD

BACKGROUND OF THE INVENTION

The invention relates to a light-mixing rod for homogenizing a light bundle, preferably for use in projection devices, wherein the intensity centroid of the light bundle moves in a longitudinal direction between a light inlet surface and a light outlet surface, and reflecting surfaces are present in the light-mixing rod, the surface normals of said reflecting surfaces being perpendicular or inclined relative to said longitudinal direction, with partial beams being reflected by said reflecting surfaces for the purpose of guiding the light bundle.

In the optical field, light-mixing rods (integrators) are used, in particular, where uniform illumination of fields of illumination is required. Embodiments thereof are solid mixing rods (utilizing the total reflection at the interfaces to the air) or hollow mixing rods, which essentially consist of a basic body whose lateral surfaces are uniformly provided with reflecting coatings. Light coupled into the integrator via the light inlet surface is reflected back and forth several times at the reflecting surfaces until it reaches the light outlet surface. On account of the so-called "mixing" of the light, a homogenized field of illumination is formed on the light outlet surface, depending on the cross-section and the length of the integrator. A solution of this kind is described, for example, in DE 198 19 245 C1.

One possibility of generating a uniformly illuminated field in the light outlet surface is to, first, image the field of illumination of a burner arranged in the primary focus of an ellipsoid reflector into the secondary focus of said ellipsoid reflector. This field of illumination is very inhomogeneous and has an aperture which depends on the angular radiation characteristic of the burner and on the opening of the ellipsoid reflector. The inlet surface of the light-mixing rod is illuminated using this spot of the secondary focus. If the lateral surfaces of the integrators are parallel to each other, the apertures in the light outlet surface correspond to the apertures in the light inlet surface.

Such variants are very complicated in structural terms. On top of this, there is the relatively great complexity of adjustment for coupling the light bundle into the light-mixing rod. For example, in order to realize a color management having a variable adjustment of color, additional, mechanically moved parts are required.

In view of the disadvantages of the described prior art, it is an object of particular embodiments of the invention to conceive a light-mixing rod reducing the structural complexity required to produce a homogenized field of illumination and allowing a variable color adjustment of the field of illumination without additional, mechanically moved structural components.

SUMMARY OF THE INVENTION

According to preferred embodiments a light-mixing rod as described above, which may be provided as a hollow integrator in that light emitting diodes (luminescence diodes or luminescent diodes) having a direction of action oriented toward the interior space and of a defined radiation characteristic are arranged, in the lateral surfaces of the light-mixing rod in order to generate the light bundle, so as to effect sufficient mixing of the partial light bundles along the way to the light outlet surface, said light emitting diodes advantageously being coupled with a pulse-generating and/or wavelength-modifying control unit.

For the high efficiency to be aimed for and the desired radiation characteristic at the smallest possible angles of aperture in the field of illumination of the light outlet surface, it is preferable, if the angular radiation characteristic of the light emitting diodes is preferably located in the longitudinal direction of the light-mixing rod and, perpendicular thereto, is as small as possible. Moreover, the angular radiation characteristic of the light emitting diodes in the light inlet surface of the integrator should have angles, relative to the optical axis of the integrator, which are as small as required in the plane of the light outlet surface.

Light emitting diodes, which are arranged, for example, in the light inlet surface of a light-mixing rod, are conventionally unsuitable to generate a homogenized field of illumination in the light outlet surface. This is caused by the relatively large apertures of the diodes, which are then still present in the light outlet surface as well. The relatively large light outlet surface of a light-mixing rod creates a large geometric flow, which is unsuitable for most applications. Therefore, the light emitting diodes arranged in the light inlet surface are required to have an angular radiation characteristic characterized by small angles to the optical axis of the integrator.

As a result of the arrangement, according to preferred embodiments of the invention, of the light emitting diodes in the lateral surfaces of the light-mixing rod, the—per se—relatively great radiation characteristic of the diodes is utilized in order to generate, on the light outlet surface, a homogeneous field of illumination having a relatively small angle of aperture and being suitable for most applications.

The light emitting diodes emit light into the interior of the light-mixing rod, without substantially influencing the reflecting surfaces, since their outlet surfaces are relatively small. Due to their radiation characteristic as described above, the light bundles are reflected by the reflecting lateral surfaces and by the reflecting light inlet surface of the light-mixing rod in such a manner that a uniformly illuminated surface having the required small angles of aperture is obtained during the passage of the light bundles to the light outlet surface.

Advantageously, the light outlet surfaces of the light emitting diodes, said surfaces being directed toward the interior space of the mixing rod, preferably should be provided with mirrors at those surface parts not needed for light passage, which are to be arranged parallel to or exactly conforming to the reflecting internal surfaces of the light-mixing rod. This leads to the smallest possible reduction of the reflecting internal surface of the light-mixing rod by means of the surface area required for coupling the beams of the light emitting diodes into the integrator and to an increase in efficiency.

Light emitting diodes switched after each other in a time sequence and having different wavelengths allow a color management (color synchronization) to be produced without the additional requirement of mechanically moved components. Simultaneously, colors may be varied almost infinitely via a corresponding control unit for the light emitting diodes having different wavelengths.

In order to generate a uniformly illuminated field of illumination in the light outlet surface of the integrator, the light emitting diodes are conveniently arranged near the light inlet surface and within the latter itself.

Specific angles of aperture can be achieved by the use of light emitting diodes having different radiation characteristics.

In an advantageous embodiment, one or more light emitting diodes may be additionally accommodated within the reflecting light inlet surface. These are required to have approximately such an angular radiation characteristic as that required in the light inlet surface of the integrator.

These light emitting diodes are effective in increasing the luminous flux. In order to achieve a high efficiency, in this connection, the radiation characteristic should be such that the main component of the light is propagated in the longitudinal direction of the light-mixing rod, while the light component having a perpendicular orientation to the longitudinal direction is as small as possible.

Since, in some instances, the luminous flux generated using the light emitting diodes may not be sufficient for certain applications, it turns out to be convenient, in another advantageous embodiment, to use a light-mixing rod as a combination of several partial elements, sequentially arranged in the light guiding direction as well as optically coupled with each other, which partial elements may be either equivalent or different in their arrangement of the light emitting diodes.

In order to allow multi-functional use of the light-mixing rod according to the invention in a device, it is advantageous to additionally couple the light bundle of a further source of illumination into the light inlet surface, which then no longer strictly requires the light inlet surface to be designed to reflect into the interior space of the light-mixing rod. Said source of illumination may be, for example, the secondary focus of an ellipsoid reflector comprising a gas-discharge lamp.

The light-mixing rod according to the invention will be explained in more detail below with reference to an embodiment example.

DETAILED DESCRIPTION OF PREFERRED EMBODIMENTS

Figure 1:
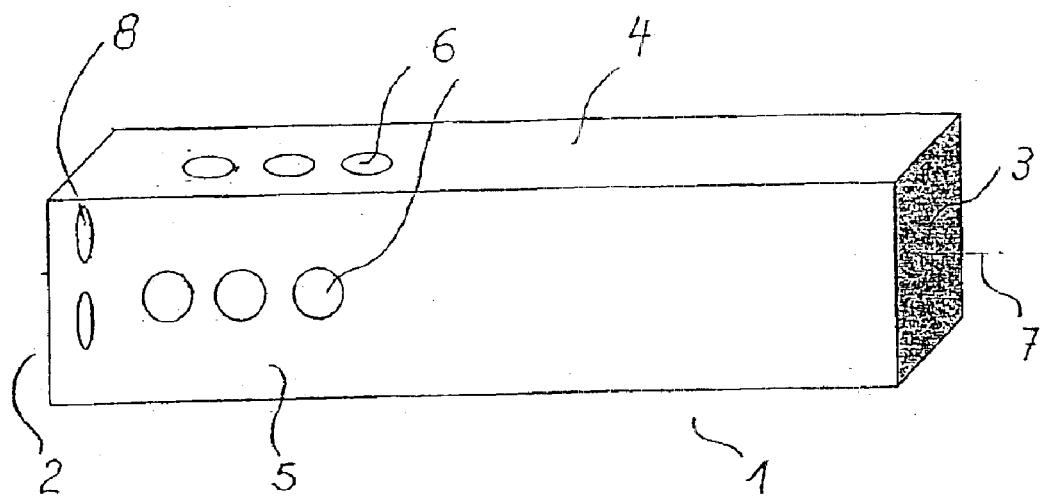
FIG. 1 shows a schematic view of the light-mixing rod.

FIG. 1 shows the light-mixing rod 1 of the invention in the shape of a parallelepiped solid integrator comprising a light inlet surface 2 and a light outlet surface 3, both of rectangular cross-section. In each of the lateral surfaces which are perpendicular to each other, of which only lateral surfaces 4 and 5 are shown for simplified illustration, there are three light emitting diodes 6 having the same radiation characteristic, whose light propagation directions (axes) have an orientation perpendicular to the light guiding direction in the light-mixing rod 1. The radiation characteristics of the light emitting diodes 6 in the reflecting lateral surfaces 4 and 5 possess, in their light propagation direction (axis), the largest possible angles of aperture in the longitudinal direction of the optical axis 7 of the light-mixing rod 1. In the plane perpendicular to the optical axis 7 of the light-mixing rod 1, they emit little or no energy, so as to form the smallest possible angles of aperture in the field of illumination of the light outlet surface 3 with a great luminous flux.

At the same time, two light emitting diodes 8 having a radiation characteristic effective in the light guiding direction are located in the light inlet surface 2. The angular radiation characteristic of these light emitting diodes 8, in this connection, has angles relative to the optical axis 7, which are as small as required in the plane of the light outlet surface 3.

The angles of aperture of the light emitting diodes 8 need to be substantially smaller than the angles of aperture of the light emitting diodes 6 in the lateral surfaces 4 and 5 of the light-mixing rod 1, since they are intended to form small angles of aperture in the plane of the light outlet surface 3.

All lateral surfaces (of which only 4 and 5 are shown) of the light-mixing rod 1 and the light inlet surface 2 are designed to reflect into the interior of the light-mixing rod 1 (possibly, most simply, by total reflection), so that the light emitted by the light emitting diodes 6 and 8 is reflected when passing to the light outlet surface 3. Multiple reflections produce a homogenized field of illumination on the light outlet surface 7, said field of illumination having relatively small angles of aperture sufficient for a large number of applications.

A control unit, not shown in FIG. 1, which is coupled with the light emitting diodes 6 and 8, enables control of the light emitting diodes 6 and 8 at different wavelengths, so that colors may be varied almost infinitely, according to the switching condition. If the light emitting diodes 6 and 8, in particular the light emitting diodes 6 arranged in the lateral surfaces 4 and 5, are controlled by successively using different wavelengths, this produces a defined color management, without requiring additional auxiliary elements of movement.

Figure 2:
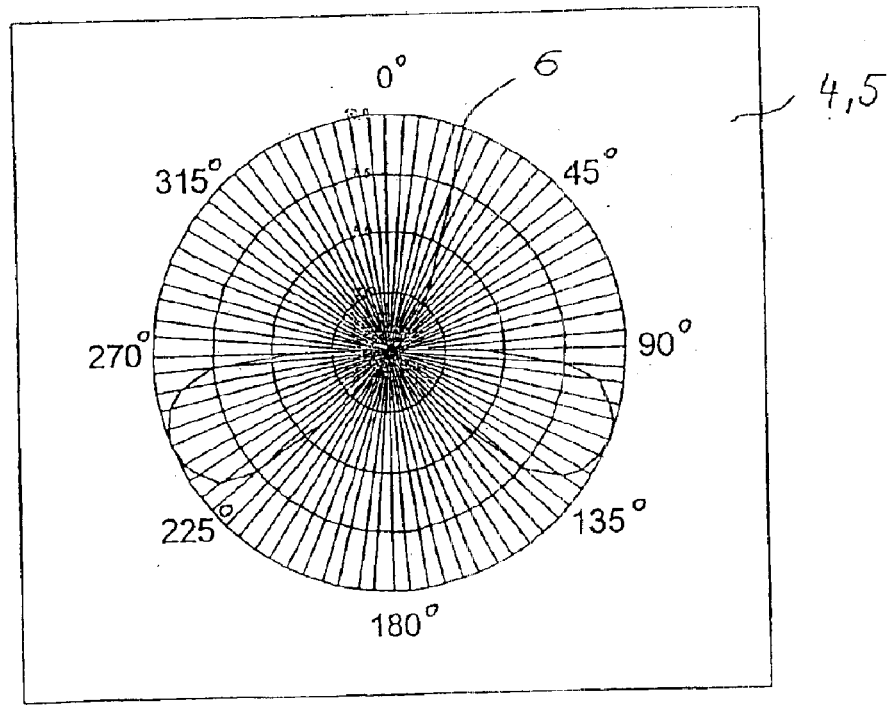
FIG. 2 shows an example of the radiation characteristic of the light emitting diodes in a longitudinal direction of their axis.
Figure 3:
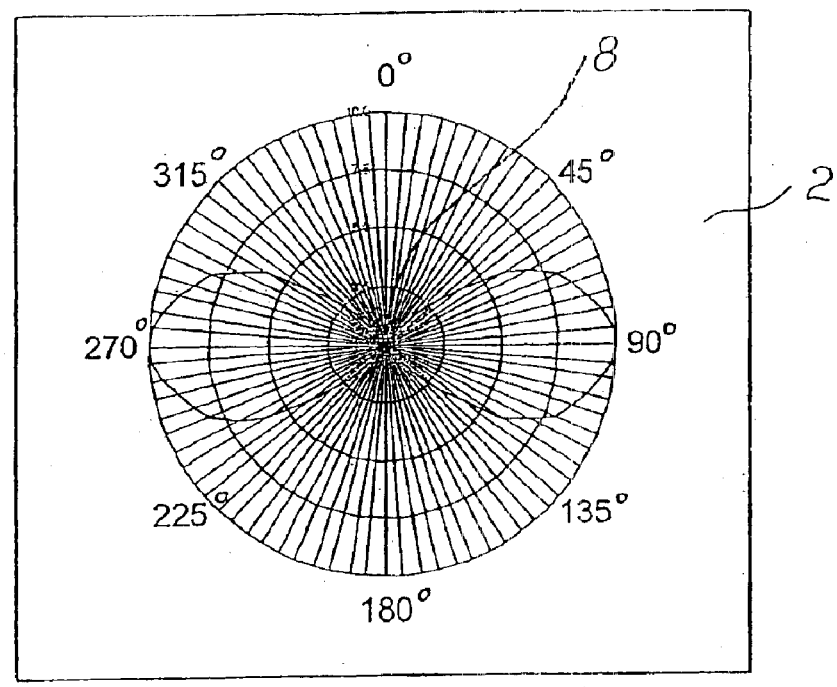
FIG. 3 shows an example of the radiation characteristic of the light emitting diodes in the direction of the optical axis of the light-mixing rod.

The radiation characteristics of a light emitting diode 6 (large angle of aperture) and of a light emitting diode 8 (small angle of aperture) are shown in FIG. 2 and FIG. 3.

FIG. 2 shows a side view of a light emitting diode 6 (axis perpendicular to the optical axis 7 of the light-mixing rod 1) having a luminous flux which is propagated in the longitudinal direction of the optical axis 7 of the light-mixing rod 1 (a direction of 90 to 270 degrees). As is evident, large angles of aperture with a great luminous flux are present in the direction of azimuth, in the longitudinal direction of the optical axis 7, while no radiation occurs in the direction of azimuth transversely of the longitudinal direction of the optical axis 7 of the light-mixing rod 1.

The angular radiation characteristic of a light emitting diode 6, shown in FIG. 3, as viewed in the direction of its axis, clearly shows that the angular radiation in the direction of the optical axis 7 of the light-mixing rod 1 (a direction of 90 degrees to 270 degrees) must be large, but should not be present, if possible, transversely thereof, since it would then form unnecessary, large angles of aperture in the light outlet surface 3 of the light-mixing rod 1.

The light emitting diode 8 in the light inlet surface 2, with its angular radiation characteristic in the direction of the optical axis 7, exhibits small angles of aperture relative to the optical axis 7 at a high luminous flux, corresponding to the angular radiation characteristic directed toward the inner surface of the light-mixing rod 1, as in FIG. 3.

The combination of the radiation characteristics of the light emitting diodes 6 and 8 shown in FIGS. 2 and 3 produces a field of illumination having relatively small angles of aperture on the light outlet surface 3 of the light-mixing rod 1.

Figure 4:
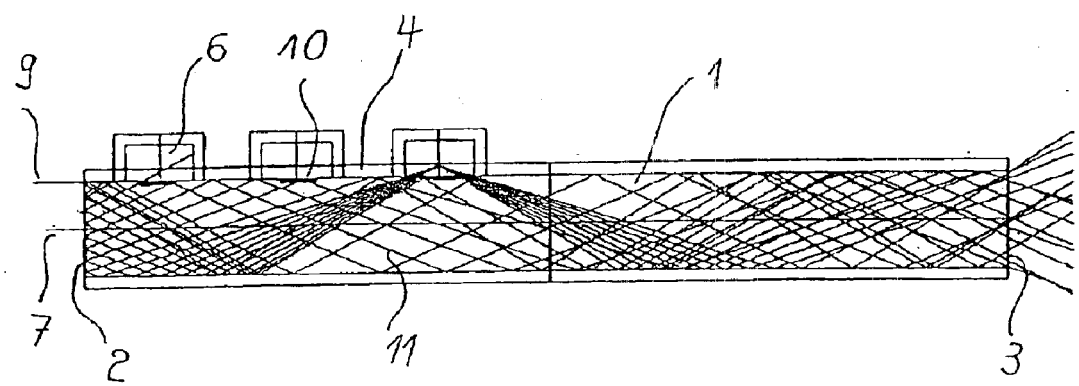
FIG. 4 shows the optical ray path at the hollow integrator with an active light emitting diode
Figure 5:
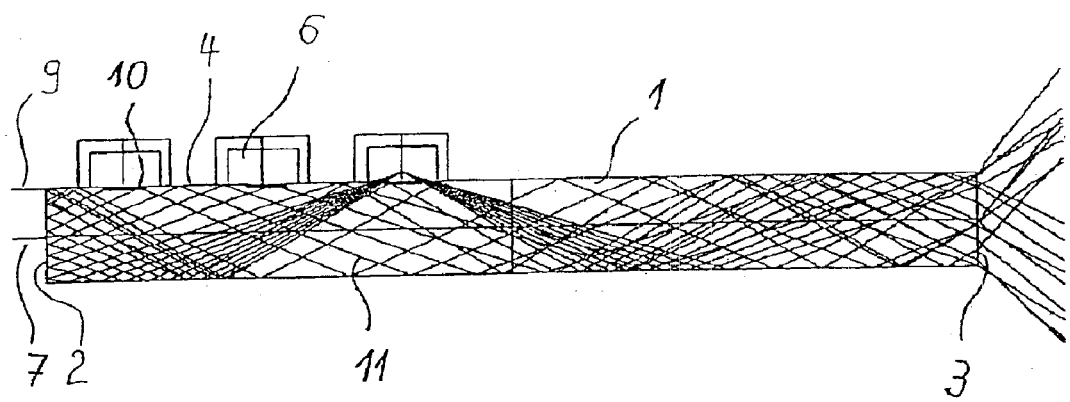
FIG. 5 shows the optical ray path at the solid integrator with an active light emitting diode.

Schematic representations of the multiple reflections are shown in FIG. 4 (hollow mixing rod) and FIG. 5 (solid mixing rod).

Using a hollow mixing rod according to FIG. 4, there must not be any reflections in the lateral surface plane 9 of the light-mixing rod 1 at the coupling-in surfaces of the light emitting diodes 6 into the light-mixing rod 1. In the present embodiment example, this is achieved by using light emitting diodes 6 present in air, which light emitting diodes 6 emit light through openings in the lateral surfaces (of which only lateral surface 4 is shown) into the interior space of the light-mixing rod 1.

Those surface parts perpendicular to the optical axis 7 of the light emitting diodes 6 through which no radiation is to be effected (no small angles of aperture), are covered by mirrors 10 in the lateral surface plane 9 with reflecting coatings directed toward the interior space of the light-mixing rod 1. This minimizes losses in the partial beam bundles 11 reflected at the lateral surfaces 4 and 5 of the light-mixing rod 1 in the interior space.

The use of a solid mixing rod according to FIG. 5, too, does not allow any reflections in the lateral surface plane 9 at the coupling-in surfaces of the light emitting diodes 6. For this purpose, the light emitting diodes 6 are embedded in a material which is very similar or equal to the material of the light-mixing rod 1 in terms of its refractive index. As in the hollow mixing rod, those surface parts perpendicular to the optical axis 7 of the light emitting diodes 6 through which no radiation is to be effected (no small angles of aperture) may be covered by mirrors 10 in the lateral surface plane 9 with reflecting coatings directed toward the interior space of the light-mixing rod 1.

In doing so, the hollow mixing rod has the advantage that there is no increase in aperture at the light outlet surface 3, unlike in the case of the solid mixing rod. Therefore, the hollow mixing rod allows to achieve a smaller Etendue value than the solid mixing rod, at the same luminous flux.

What is claimed is:

1. A light-mixing rod for homogenizing a light bundle, comprising:
    a light inlet surface;
    a light outlet surface;
    a longitudinal axis;
    internal lateral reflecting surfaces within the light mixing rod having surface normals that are substantially perpindicular to the longitudinal axis; and
    light emitting diodes emitting light oriented toward an interior space of the light mixing rod with partial beams reflected by the reflecting surfaces so as to guide a light bundle, the light emitting diodes arranged such that substantial mixing of the partial radiation beams is achieved prior to emission at the light outlet surface and wherein the intensity centroid of the light bundle moves along the longitudinal axis between the light inlet surface and the light outlet surface.

2. The light-mixing rod as claimed in claim 1, comprising at least one light emitting diode having a direction of action oriented toward the interior of the light-mixing rod is arranged in the light inlet surface of the light-mixing rod.

3. The light-mixing rod as claimed in claim 1, wherein the light emitting diodes are arranged near the light inlet surface such that at least two reflections of the maximum angles of aperture present occur in the light-mixing rod, prior to emission at the light outlet surface for sufficient mixing of the partial beams to achieve a uniformly illuminated field.

4. The light-mixing rod as claimed in claim 1, wherein light emitting diodes having different radiation characteristics are utilized.

5. The light-mixing rod as claimed in claim 4, wherein the light emitting diodes fixed in the lateral reflecting surfaces of the light-mixing rod emit light at the largest possible angles of aperture in the direction of light propagation along an optical axis of the light-mixing rod and emit little or no energy in the plane perpendicular to the optical axis.

6. The light-mixing rod as claimed in claim 4, wherein the light emitting diodes in the light inlet surface emit light at angles to the optical axis of the light-mixing rod which are as small as required in the plane of the light outlet surface.

7. The light-mixing rod as claimed in claim 1, wherein the light inlet surface of the light-mixing rod is a reflecting surface.

8. The light-mixing rod as claimed in claim 1, wherein the light emitting diodes are coupled with a control unit selected from a group consisting of a pulse-generating control unit and a wavelength-modifying control unit.

9. The light-mixing rod as claimed in claim 1, wherein the light-mixing rod comprises at least two partial elements, which are arranged in sequence in the light guiding direction, are optically coupled, with only the initial light-mixing rod having a reflecting light inlet surface.

10. The light-mixing rod as claimed in claim 1, further comprising an external source of illumination, directed toward the light inlet surface, for the purpose of forming the light bundle.

11. The light-mixing rod as claimed in claim 1, wherein the light outlet surfaces of the light emitting diodes arranged in at least one of the lateral surfaces and the light inlet surface of the light-mixing rod and wherein the light emitting diodes are partially covered by mirrors at those surface parts not required for the light emission, wherein the mirrors are parallel to or coplanar with a plane of the surface in which the light emitting diodes arranged.

12. The light-mixing rod as claimed in claim 1, comprising a solid integrator, wherein the light emitting diodes located in at least one of the lateral surfaces of the light-mixing rod and in the light inlet surface are embedded in a material of similar refractive index to the material of the light-mixing rod.

13. A light-mixing rod for homogenizing a light bundle, wherein the intensity centroid of the light bundle moves in a longitudinal direction between a light inlet surface and a light outlet surface, and reflecting surfaces are present in the light-mixing rod, the surface normals of said reflecting surfaces being perpendicular or inclined relative to said longitudinal direction, with partial beams being reflected by said reflecting surfaces so as to guide the light bundle, wherein said light-mixing rod, for the purpose of generating the light bundle in the lateral surfaces of the light-mixing rod, light emitting diodes having a direction of action oriented toward the interior space are arranged such that sufficient mixing of the partial radiation beams is effected on the way to the light outlet surface to create a uniform illumination field.

14. The light mixing rod as claimed in claim 13, comprising at least one light emitting diode arranged to emit light into the light mixing rod and located in the light inlet surface.

15. The light mixing rod as claimed in claim 13, comprising light emitting diodes located near the light inlet surface such that at least two reflections of the maximum angles of aperture occur in the light mixing rod prior to emission from the outlet surface for sufficient mixing of the partial beams to achieve a uniformly illuminated field.

16. The light-mixing rod as claimed in claim 13, wherein light emitting diodes having different radiation characteristics are utilized.

17. The light-mixing rod as claimed in claim 15, wherein the light emitting diodes fixed in the lateral reflecting surfaces of the light-mixing rod emit light at the largest possible angles of aperture in the direction of light propagation along an optical axis of the light-mixing rod and emit little or no energy in the plane perpendicular to the optical axis.

18. The light-mixing rod as claimed in claim 14, wherein the light emitting diodes fixed in the light inlet surface have a maximum light emission in a direction substantially parralel to the longitudinal direction.

19. The light-mixing rod as claimed in claim 13, wherein the light emitting diodes are coupled with a control unit selected from a group consisting of a pulse-generating control unit and a wavelength-modifying control unit.

20. The light-mixing rod as claimed in claim 13, wherein the light-mixing rod comprises at least two partial elements, which are arranged in sequence in the light guiding direction and are optically coupled, with only the initial light-mixing rod having a reflecting light inlet surface.

21. The light-mixing rod as claimed in claim 13, wherein the light outlet surfaces of the light emitting diodes arranged in at least one of the lateral surfaces and the light inlet surface of the light-mixing rod and wherein the light emitting diodes are partially covered by mirrors at those surface parts not required for the light emission, wherein the mirrors are parallel to or coplanar with a plane of the surface in which the light emitting diodes arranged.

22. The light-mixing rod as claimed in claim 13, comprising a solid integrator, wherein the light emitting diodes located in at least one of the lateral surfaces of the light-mixing rod and in the light inlet surface are embedded in a material of similar refractive index to the material of the light-mixing rod.

23. A projector comprising a light-mixing rod for homogenizing a light bundle, the light mixing rod comprising:

a light inlet surface;

a light outlet surface;

a longitudinal axis;

internal lateral reflecting surfaces within the light mixing rod having surface normals that are substantially perpindicular to the longitudinal axis; and light emitting diodes emitting light oriented toward an interior space of the light mixing rod with partial beams reflected by the reflecting surfaces so as to guide a light bundle, the light emitting diodes arranged such that substantial mixing of the partial radiation beams is achieved prior to emission at the light outlet surface and wherein the intensity centroid of the light bundle moves along the longitudinal axis between the light inlet surface and the light outlet surface.

* * * * *